United States Patent
Iwashita et al.

[11] Patent Number: 6,029,100
[45] Date of Patent: *Feb. 22, 2000

[54] METHOD FOR CONTROLLING OXIDATION IN FLUE GAS DESULFURIZATION

[75] Inventors: Koichiro Iwashita, Tokyo; Susumu Okino; Naohiko Ukawa, both of Hiroshima; Masaru Sakamoto, Yokohama, all of Japan

[73] Assignee: Mitsubishi Jukogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,859

[22] Filed: Feb. 11, 1997

[30] Foreign Application Priority Data

Jun. 28, 1996 [JP] Japan ................................ 8-169859

[51] Int. Cl.⁷ ............................................... G05B 6/00
[52] U.S. Cl. .............. 700/266; 423/243.01; 423/243.08; 423/DIG. 5; 422/105; 422/168; 700/282
[58] Field of Search ........................ 423/DIG. 5, 243.01, 423/243.08; 422/105, 108, 110, 111, 168, 172; 700/266, 282

[56] References Cited

U.S. PATENT DOCUMENTS 5,766,563  6/1998  Tanaka et al. ........................ 423/242.1

FOREIGN PATENT DOCUMENTS

| | | |
|---|---|---|
| 0173403 A2 | 3/1986 | European Pat. Off. . |
| 0224627 A1 | 6/1987 | European Pat. Off. . |
| 0442250 A2 | 8/1991 | European Pat. Off. . |
| 0692299 A1 | 1/1996 | European Pat. Off. . |
| 60-226403 | 11/1985 | Japan . |
| 2-174914 | 7/1990 | Japan ..................................... 422/111 |
| 3-72912 | 3/1991 | Japan ..................................... 422/108 |
| 3-59731 B2 | 9/1991 | Japan . |
| 4-290522 | 10/1992 | Japan ................................ 423/243.01 |
| 96/14137 | 5/1996 | WIPO . |

OTHER PUBLICATIONS

Perry et al. "Chemical Engineers' Handbook" 5th Edition McGraw–Hill Book Co. USA, pp. 22–19 to 22–33, ISBN No. 0–07–049478–9, 1973, no month.

*Primary Examiner*—Gary P. Straub
*Assistant Examiner*—Timothy C Vanoy
*Attorney, Agent, or Firm*—Eugene Lieberstein; Michael N. Meller

[57] ABSTRACT

There is provided a method for flue gas desulfurization which is capable of conducting minute control of oxidation and which is capable of maintaining the concentration of sulfurous acid in an absorbent liquid within a proper range in a highly reliable and efficient manner, even in the case where an abrupt change occurs in the operational conditions of the system. In the method for controlling the oxidation in flue gas desulfurization, the value of proportional sensitivity K in the feed back control process, which is based primarily on the oxidation-reduction potential, is increased depending on the deviation $\epsilon$ in a region where the detected oxidation reduction potential value PN is below the target oxidation reduction potential value SN in correspondence with the characteristic change of the oxidation-reduction potential against the concentration of sulfurous acid.

6 Claims, 8 Drawing Sheets

FIG. 3

SYMBOLS OF ELEMENTS

| K | ---- PROPORTIONAL |

| △ | ---- SUBSTRACTION |

| Σ | ---- ADDITION |

| × | ---- MULTIPLICATION |

| ≥ | ---- LOWER LIMIT |

| ≤ | ---- UPPER LIMIT |

| $\frac{d}{dt}$ | ---- DIFFERENTIATION |

| S | ---- INTEGRATION |

METHOD FOR CONTROLLING OXIDATION IN FLUE GAS DESULFURIZATION

BACKGROUND OF THE INVENTION

1. Field of the Invention

The present invention relates to the art of wet flue gas desulfurization, utilizing a calcium compound such as limestone as an absorbent, and more particularly to a method for controlling the oxidation of sulfurous acid in an absorbing liquid.

2. Description of the Related Art

As for a wet flue gas desulfurization process, the state of the art utilizes a so-called in-situ process which does not require an oxidation tower and which operates by blowing air into a tank positioned at the bottom of an absorption tower in order to oxidize an absorbent slurry (an absorbing liquid in a form of a suspension of an absorbent comprising limestone) that has absorbed sulfurous acid to thereby produce gypsum as a by-product. In this case, the main reactions that take place during the treatment are indicated by the following reactions (1) through (3).

(Absorption tower)

$$SO_2 + H_2O \rightarrow H^+ + HSO_3^- \qquad (1)$$

(Tank)

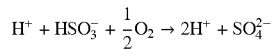

$$H^+ + HSO_3^- + \frac{1}{2}O_2 \rightarrow 2H^+ + SO_4^{2-} \qquad (2)$$

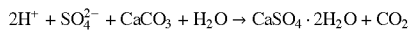

$$2H^+ + SO_4^{2-} + CaCO_3 + H_2O \rightarrow CaSO_4 \cdot 2H_2O + CO_2 \qquad (3)$$

In the case of the above-described in-situ process, it is particularly important to maintain the concentration of sulfurous acid in the absorbent slurry within a low level range close to zero (about 0 to 5 mmol/liter) by instantly oxidizing the sulfurous acid substantially completely to promote the reactions (2) and (3) without allowing the sulfurous acid derived from the reaction (1) to deposit as calcium sulfite.

In the case where oxidation is insufficient, such that the concentration of sulfurous acid rises, and particularly where calcium sulfite is deposited, some of the problems encountered will result in a significant drop in the desulfurization due to the inhibition of the reaction (1); the reactivity of the lime stone (calcium compound) drops; and the purity of gypsum (by-product) obtained by the reaction (3) decreases.

As a usual measure to avoid the above-mentioned problems, fine bubbles of oxidizing air (oxygen-containing gas) is continuously blown into the slurry of an absorbing tank to forcibly cause the oxidation reaction (2) to proceed. However, an excessive supply of air results in a rise in system operation cost.

Moreover, according to the recent studies of the present inventors, peroxides which have been generated by an excessive oxidation of slurry are found to deteriorate an adsorbent resin in the waste water treatment facility of the slurry so that the capacity to control a chemical oxygen demand (COD) deceases. On the other hand, if the concentration of sulfurous acid becomes higher because of an oxidation deficiency (insufficient oxidation), the COD value in waste water from the slurry is known to become higher.

Accordingly, also from the COD treating aspect, it is necessary to control the supply of oxidizing air to keep a flow rate within a minimal requirement and to maintain the concentration of sulfurous acid within the above-mentioned low level range with high reliability. Such methods for control include those disclosed by Japanese Patent Provisional Publication (JP-A) No.60-226,403 and Japanese Patent Provisional Publication (JP-A) No.61-433 (Japanese Patent Publication (JP-B) No.3-59,731).

Japanese Patent Provisional Publication (JP-A) No.60-226,403 discloses a process comprising continuous detection of a sulfite concentration (including the sulfurous acid present as an ion) in an absorbing liquid, and regulation of the oxidizing catalyst supply in accordance with a signal of deviation of the detected value from a preset value of the sulfite concentration. In this case, the sulfite concentration is determined by a procedure comprising taking a sample liquid by means of a measuring pump, generating a gas from the sample liquid by adding thereto an acid such as hydrochloric acid, and calculating the sulfite concentration of the sample liquid based on the concentration of sulfur dioxide in the generated gas of the preceding step.

Japanese Patent Publication (JP-B) No.3-59,731 discloses a process comprising the steps of continuously detecting an oxidation-reduction potential (ORP) of an absorbent slurry and effecting a feed back control so that the detected value equals a desired sulfite concentration to thereby keep calcium sulfite completely oxidized (i.e., within a low concentration range close to zero).

The conventional process disclosed in Japanese Patent Provisional Publication (JP-A) No.60-226,403 requires as long as 10 to 20 minutes for the measurement of the concentration of sulfite. Accordingly, this process is feasible in the case where the operational conditions including the quantity of sulfur dioxide [(flow rate of flue gas)× (concentration of sulfur dioxide)] in the flue gas gradually change. However, a problem arises in the case where operational conditions abruptly change. For example, a load change of a boiler, which is a source of flue gas, is generally abrupt. Therefore, this process can hardly follow the fluctuation in an operational condition that accompanies the above-mentioned load change, thus has not been practicable.

On the other hand, according to the method for controlling ORP as disclosed in Japanese Patent Publication (JP-B) No.3-59,731, only a very short time is required for the detection of an ORP value and the detected ORP value sharply reflects the change in the concentration of sulfurous acid. Therefore, this process provides a practicable follow-up and controllability to some extent by a simple proportional control. For the realization of an oxidation control with a higher efficiency and reliability, however, the following disadvantages of the above-mentioned process need to be overcome.

(a) According to detailed analysis by the present inventors of the actual correlation between the concentration of sulfurous acid and ORP in an absorbent liquid in such a flue gas desulfurization apparatus, the correlation is expressed, for example, by an exponential curve as shown in FIG. 4 and reveals that the correlation significantly drops when OPR is on the decrease. Therefore, in a simple proportional control (or PID control) where a proportional gain is constant, an action to increase the flow rate of oxidizing air, at the time when a load change causes ORP to decrease (when the concentration of sulfurous acid increases), is delayed, results in an increased possibility that the concentration of sulfurous acid exceeds a proper range over a long period of time.

(b) In the case of an excessively oxidized state where a detected ORP value is well over a target value, if the flow rate of oxidizing air is reduced based on the deviation without any restriction, an action to increase the flow rate of oxidizing air to meet the case where a load change reverses the state to cause ORP to decrease abruptly is delayed, resulting in an increased possibility that the concentration of sulfurous acid exceeds a proper range over a long period of time.

(c) Since the correlation between ORP and the concentration of sulfurous acid in an absorbent liquid varies depending on pH values of the absorbent liquid, an action in a simple proportional control where the target value of ORP is constant, can take the concentration of sulfurous acid out of a proper range as a result of a change in pH of the absorbent liquid, despite the fact that ORP is controlled within a proper range.

(d) Since the change in the properties of an absorbent liquid, for example, due to contamination with impurities can abnormally change the correlation between ORP and the concentration of sulfurous acid in an absorbent liquid, and since the quantity of the oxidizing air basically required for the quantity of sulfur dioxide in the flue gas can vary, the action by the above simple proportional control may possibly take the concentration of sulfurous acid out of a proper range.

(e) The change in the quantity of the circulating absorbent liquid can cause the amount of auto-oxidation to vary, and may change the minimally required quantity of oxidizing air. Also in this case, an action in a simple proportional control may possibly take the concentration of sulfurous acid out of a proper range, and possibly further followed by an excessive supply of air.

SUMMARY OF THE INVENTION

Accordingly, the object of the present invention is to provide a method for controlling the oxidation in flue gas desulfurization which is capable of better meeting the change in the operational condition to realize a minute control of oxidation, and which is capable of maintaining the concentration of sulfurous acid in an absorbent liquid within a proper range in a highly reliable and efficient manner, even if an operational condition abruptly changes.

In order to achieve the object, by solving the above-mentioned problems, the method for controlling the oxidation in flue gas desulfurization according to the present invention has the following constitution.

(1) The method for controlling the oxidation in flue gas desulfurization of the 1st mode of the invention comprises bringing a flue gas into contact with an absorbent liquid containing a calcium compound for removal of at least sulfur dioxide from the flue gas, while maintaining the concentration of sulfurous acid in the absorbent liquid within a low level range close to zero by a feed back control process, comprising continuously detecting an oxidation-reduction potential of the absorbent liquid and increasing or decreasing the flow rate of an oxygen-containing gas to be blown into the absorbent liquid so that the detected oxidation-reduction potential matches a predetermined target value, wherein a proportional gain in the feed back control process, which determines a control input for regulating the flow rate of the oxygen-containing gas against a deviation, obtained from the difference between the target value and a detected value, is increased depending on the deviation in a region where the detected value is below the target value, in correspondence with the characteristic change of the oxidation-reduction potential against the concentration of sulfurous acid.

(2) The method for controlling the oxidation in flue gas desulfurization of the 2nd mode of the invention comprises bringing a flue gas into contact with an absorbent liquid containing a calcium compound for removal of at least sulfur dioxide from the flue gas, while maintaining the concentration of sulfurous acid in the absorbent liquid within a low level range close to zero by a feed back control process, comprising continuously detecting an oxidation-reduction potential of the absorbent liquid and increasing or decreasing the flow rate of an oxygen-containing gas to be blown into the absorbent liquid so that the detected oxidation-reduction potential matches a predetermined target value, wherein an upper limit for a deviation, obtained from the difference between the target value and a detected value, is set up in a region where the detected value is above the target value so that a control input regulating the flow rate of the oxygen-containing gas does not excessively change in the case where the deviation obtained exceeds the upper limit.

(3) The method for controlling the oxidation in flue gas desulfurization of the 3rd mode of the invention comprises bringing a flue gas into contact with an absorbent liquid containing a calcium compound for removal of at least sulfur dioxide from the flue gas, while maintaining the concentration of sulfurous acid in the absorbent liquid within a low level range close to zero by a feed back control process, comprising continuously detecting an oxidation-reduction potential of the absorbent liquid and increasing or decreasing the flow rate of an oxygen-containing gas to be blown into the absorbent liquid so that the detected oxidation-reduction potential matches a predetermined target value, wherein a pH value of the absorbent liquid is continuously detected and the target value of the oxidation-reduction potential in the feed back control is adapted to change depending on the detected pH value in correspondence with the characteristic change of the oxidation-reduction potential against pH.

(4) The method for controlling the oxidation in flue gas desulfurization of the 4th mode of the invention comprises bringing a flue gas into contact with an absorbent liquid containing a calcium compound for removal of at least sulfur dioxide from the flue gas, while maintaining the concentration of sulfurous acid in the absorbent liquid within a low level range close to zero by a feed back control process comprising continuously detecting an oxidation-reduction potential of the absorbent liquid and increasing or decreasing the flow rate of an oxygen-containing gas to be blown into the absorbent liquid so that the detected oxidation-reduction potential matches a predetermined target value, wherein a deviation value obtained from the difference between the target value and a detected value in the feed back control, depending on the variation of the concentration of the sulfurous acid, is increased or decreased in a direction to offset the foregoing variation.

(5) The method for controlling the oxidation in flue gas desulfurization of the 5th mode of the invention comprises bringing a flue gas into contact with an absorbent liquid containing a calcium compound for removal of at least sulfur dioxide from the flue gas, while maintaining the concentration of sulfurous acid in the absorbent liquid within a low level range close to zero by a feed back control process, comprising continuously detecting an oxidation-reduction potential of the absorbent liquid and increasing or decreasing the flow rate of an oxygen-containing gas to be blown into the absorbent liquid so that the detected oxidation-reduction potential matches a predetermined target value, and by a feed forward control process comprising continuously detecting the quantity of the sulfur dioxide in the flue gas and increasing or decreasing the flow rate of an go oxygen-containing gas depending on the detected quantity of the sulfur dioxide, wherein a control input of the flow rate of the oxygen-containing gas in the feed forward control is increased or decreased depending on the circulating flow rate of the absorbent liquid so that the flow rate of the oxygen-containing gas is decreased by a quantity corresponding to an auto-oxidation.

(6) The method for controlling the oxidation in flue gas desulfurization of the 6th mode of the invention comprises bringing a flue gas into contact with an absorbent liquid containing a calcium compound for removal of at least sulfur dioxide from the flue gas, while maintaining the concentration of sulfurous acid in the absorbent liquid within a low level range close to zero by a feed back control process, comprising continuously detecting an oxidation-reduction potential of the absorbent liquid and increasing or decreasing the flow rate of an oxygen-containing gas to be blown into the absorbent liquid so that the detected oxidation-reduction potential matches a predetermined target value, and by a feed forward control process comprising continuously detecting the quantity of the sulfur dioxide in the flue gas and increasing or decreasing the flow rate of an oxygen-containing gas depending on the detected quantity of the sulfur dioxide, wherein a control input of the flow rate of the oxygen-containing gas in the feed forward control or a deviation in the feed back control is increased or decreased depending on the property of the absorbent liquid so that the flow rate of the oxygen-containing gas is controlled to a minimal requirement in correspondence with the change of the amount required for forcible oxidation depending on the change of the property of the absorbent liquid.

The present invention provides a method for controlling oxidation in flue gas desulfurization whereby the following effects will result.

(1) According to the 1st mode of the invention, the value of proportional sensitivity in feed back control based on oxidation-reduction potential is increased depending on the deviation in the region where a detected value of the oxidation-reduction potential is smaller than a target value, in correspondence with the characteristic change of oxidation-reduction potential against the concentration of sulfurous acid. Accordingly, the possibility that the delay in action to increase the supply flow rate of oxygen-containing gas, at the time when ORP is on the decrease (at the time when the concentration of sulfurous acid is on the increase) due to change in load, which may cause the concentration of sulfurous acid to exceed a proper range, is drastically reduced.

(2) According to the 2nd of mode of the invention, an upper limit of deviation is set in the region where the detected value of oxidation-reduction potential is greater than the target value so that the supply flow rate of the oxygen-containing gas may not excessively change in the case where the deviation exceeds the upper limit. Accordingly, the possibility that the delay in the action to increase the supply flow rate of the oxygen-containing gas, at the time when change in load reverses the condition and the oxidation-reduction potential abruptly drops, may cause the concentration of sulfurous acid to exceed a proper range, in the case where a detected value of the oxidation-reduction potential is greater than a target value thus indicating an excessive oxidation (in the case where the supply flow rate of the oxygen-containing gas is diminished), is eliminated.

(3) According to the 3rd mode of the invention, a pH value of the absorbent slurry is continuously detected and the target value of oxidation-reduction potential is adapted to change depending on the detected value in correspondence with the characteristic change of the oxidation-reduction potential against pH. Accordingly, the disadvantage that the concentration of sulfurous acid is out of the proper range despite the fact that oxidation-reduction potential itself is normally controlled within a proper range, when the pH of the absorbent slurry varies, is eliminated.

(4) According to the 4th mode of the invention, the deviation of oxidation-reduction potential increases or decreases depending on the variation of the concentration of sulfurous acid to regulate the supply flow rate of the oxygen-containing gas in a direction which offsets the variation. Accordingly, the condition where the concentration of sulfurous acid is consistently out of the proper range, even in the case where the predicted correlation between the concentration of sulfurous acid and oxidation-reduction potential disagrees with the actual situation, for example, because of an abnormal change of the property of liquid of the absorbent slurry, is eliminated.

(5) According to the 5th mode of the invention, a control input for supply flow rate of oxygen-containing gas in the feed forward control is increased or decreased depending on the circulating flow rate of the absorbent slurry so that the supply flow rate is decreased by a quantity proportional to auto-oxidation and the control input more closely relates to the actually required amount of oxidation. Accordingly, a smoother feed forward control of the supply flow rate of the oxygen-containing gas is carried out, while the concentration of sulfurous acid is maintained within a proper range in a more stable manner. In addition, the reduction in the unnecessary supply of oxygen-containing gas results in decreased power consumption and the prevention of the problems caused by excessive oxidation in a highly effective and reliable manner.

(6) According to the 6th mode of the invention, a control input for supply flow rate of oxygen-containing gas in the feed forward control is increased or decreased depending on the property of the absorbent liquid so that the flow rate of the oxygen-containing gas is controlled such that a minimal requirement is met which corresponds to the characteristic variation in the quantity required for forcible oxidation, depending on the change in liquid property of the absorbent slurry. Accordingly, even in the case where the change in property of the absorbent liquid, due, for example, to contamination with impurities, causes the quantity of forcible oxidizing air, required for the quantity of the sulfur dioxide, in the flue gas to vary, it is possible to follow this variation so that the supply flow rate of oxygen-containing gas is controlled to satisfy the minimal requirement.

BRIEF DESCRIPTION OF THE DRAWINGS

FIG. 3 explains the symbols for elements in the above-mentioned logic sequence.

DETAILED DESCRIPTION OF THE PREFERRED EMBODIMENTS

The First Embodiment

Figure 1:
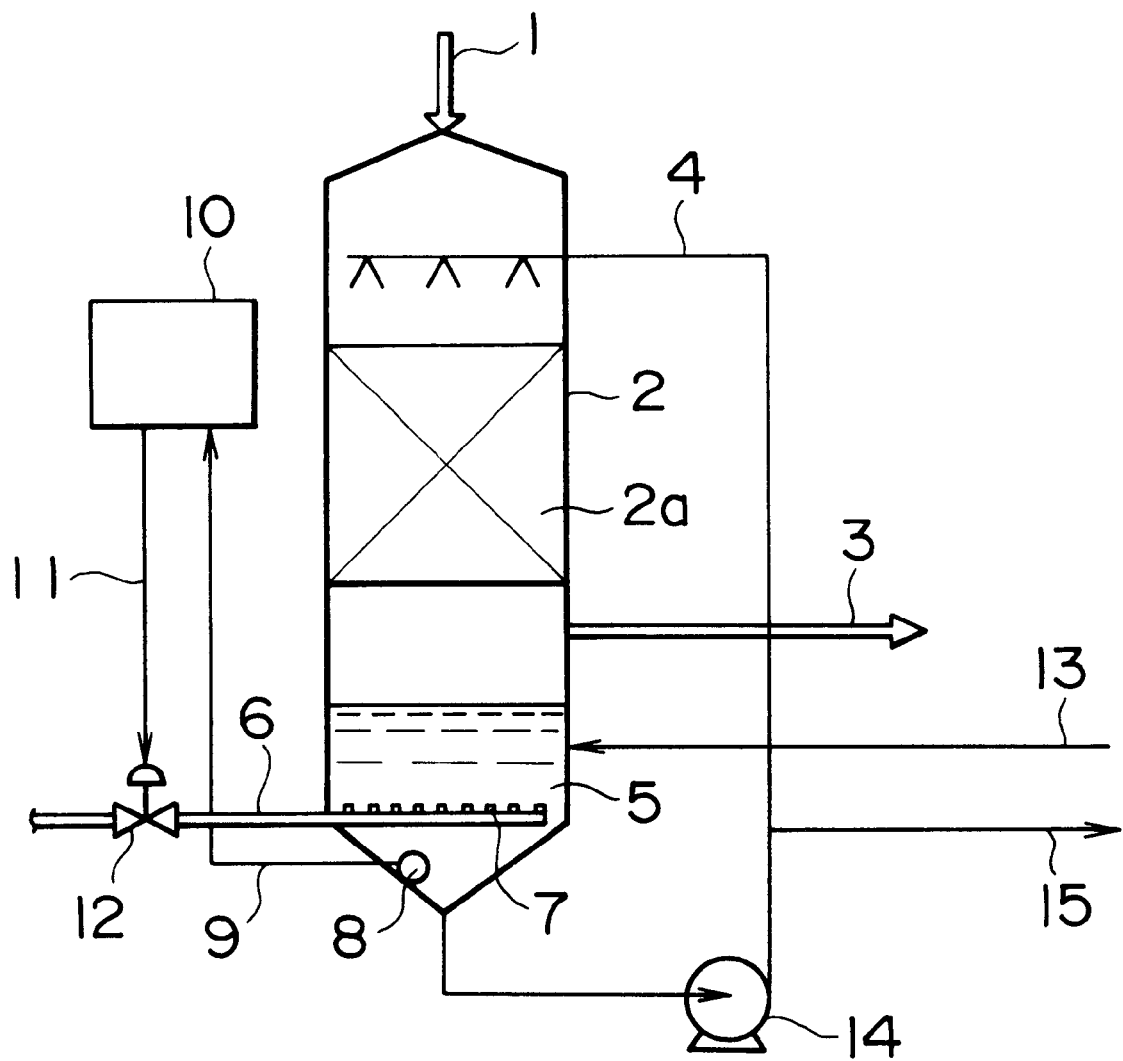
FIG. 1 illustrates an example of the construction of a desulfurization apparatus for carrying out the method for controlling oxidation relating to the first embodiment of the present invention.

FIG. 1 illustrates the construction of an apparatus for effecting the method for controlling oxidation in flue gas desulfurization which relates to the first embodiment of the present invention. As illustrated in FIG. 1, a flue gas containing sulfur dioxide ($SO_2$) is introduced into an absorption tower 2 through a duct 1 and the flue gas, after desulfurization is discharged into the air through a duct 3.

An absorbent liquid that has passed through a line 4 is sprayed inside the absorption tower 2 to cause a gas/liquid contact between the absorbent slurry flowing down through a packed material 2a and a flue gas so that at least the sulfur dioxide in the flue gas is absorbed according to the aforementioned reaction (1). The absorbent slurry that has absorbed sulfur dioxide contacts with air (oxygen containing gas) which is blown in the form of minute bubbles from disperser nozzles 7 through a line 6 so that an oxidation of the aforementioned equation (2) and neutralization of the aforementioned equation (3) proceed in sequence to form gypsum ($CaCO_4 \cdot 2H_2O$). Besides, the oxidation, of equation (2), takes place also by an auto-oxidation due to air present in the flue gas.

The ORP of the absorbent slurry is detected by an electrode 8 positioned in a tank 5. A commonly used platinum electrode is applicable as the electrode 8. The ORP detected by the electrode 8 is transmitted to a controller 10, which is based, for example, on an analogue computing circuit, via a signal line 9. According to the control explained below, the controller 10 determines a preset flow rate of oxidizing air, and transmits an opening or closing signal to a control valve 12 for opening regulation thereof through a signal line 11.

Fresh limestone slurry is introduced through a line 13 into the tank 5, and a concentration of sulfurous acid in the slurry inside the tank 5 is constantly maintained at a low range by the air flow rate for forcible oxidation controlled by the controller 10, as explained below. Consequently, the slurry contains a slight amount of unreacted limestone together with a large amount of solid gypsum. Then, the slurry is withdrawn from a line 15, on the way to the line 4 by means of a circulating pump 14, to undergo a solid-liquid separation so as to obtain gypsum.

The construction of the absorption tower 2 is not limited to a packed tower of FIG. 1, therefore other constructions including a spray-type and a liquid column-type may be used.

The location of an electrode for the detection of ORP is not limited to the inside of the tank 5, thus it may be, for example, on the line 4 or on a circulating line by means of an additional sampling pump.

An embodiment of oxidation controlling method by the above-described controller 10 according to the present invention is explained with reference to FIGS. 2–9. FIG. 3 illustrates the meanings of the symbols in the logic sequence of FIG. 2.

The controller 10 receives the following inputs: PV as a detected ORP value from the electrode 8, DpH as a detected pH value of the absorbent slurry, PN as a detected value of the concentration of sulfurous acid of the absorbent slurry, GO as an output power command signal from a thermal power generating facility which is the source of flue gas, Y as a detected concentration of sulfur dioxide at the inlet of the absorption tower 2 and Q as a circulating flow rate of the absorbent slurry in the absorption tower 2. On receiving the above-mentioned inputs, the controller 10 performs the treatment as indicated in the logic sequence of FIG. 2 to determine a preset flow rate of oxidizing air F (=F1+F2).

Except for the detection of ORP and the concentration of sulfurous acid PN, the above-described detections are commonly used and existing detecting means may also be used. The aforementioned method described in Japanese Patent Provisional Publication (JP-A) No.60-226,403 may be used for detecting the concentration of sulfurous acid. Although the circulating flow rate of the absorbent slurry Q may be detected by a flow rate sensor, it will naturally be calculated based on the number of pumps 14 for circulation, if these pumps have a constant flow rate.

The value of F1, which constitutes a preset flow rate of oxidizing air F, is a control input determined by the ORP feed back control, as explained below. On the other hand, the value of F2 is a control input determined by the feed forward control as explained below.

Figure 7:
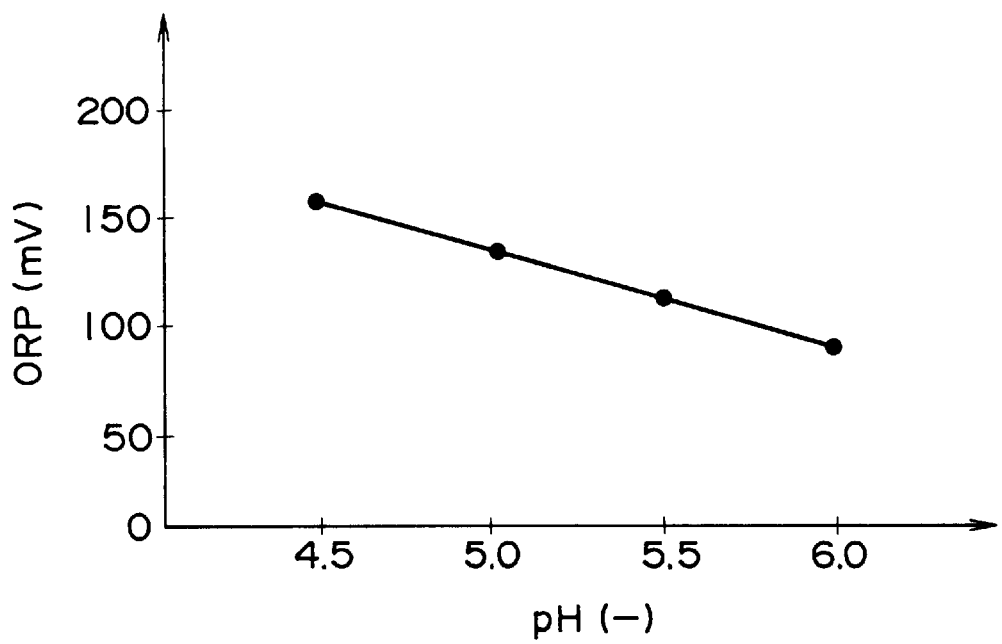
FIG. 7 illustrates an example of the correlation between pH and ORP (the concentration of sulfurous acid being constant) of the absorbent liquid in the above-mentioned desulfurization apparatus.
Figure 8:
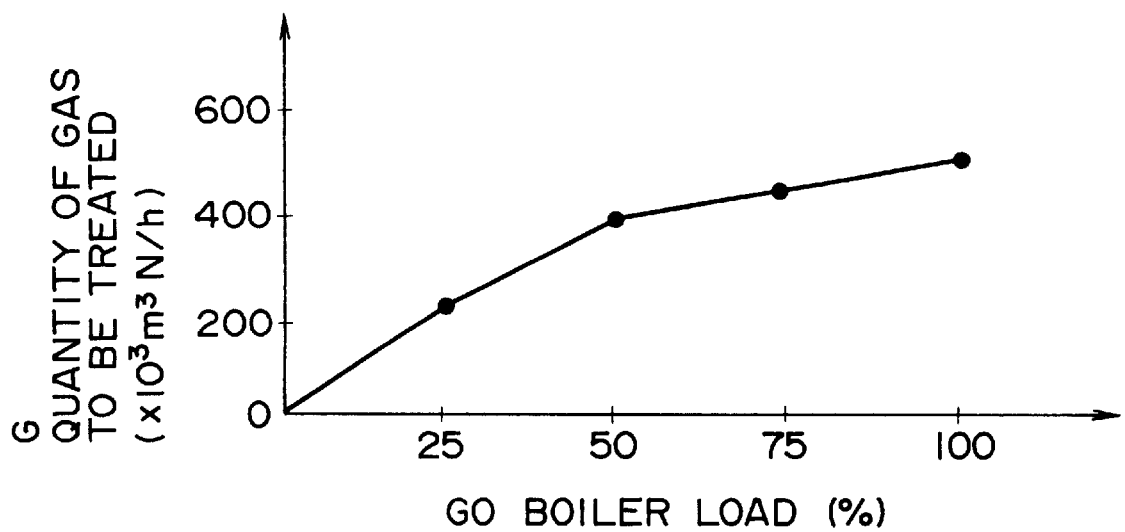
FIG. 8 illustrates an example of the correlation between boiler loads and flow rates of the (flue gas) gas to be treated in a thermal power plant equipped with the above-mentioned desulfurization apparatus.

After the input of a detected pH value of the absorbent slurry DpH into the controller 10, a target initial value of ORP (SV0) is fed from the controller 10 based on a signal transformation element (STE) 21 of optimum preset ORP against pH. The STE 21 of optimum preset ORP against pH provides various target SV values of ORP corresponding to characteristics change of ORP against pH and includes predetermined characteristics, for example, of FIG. 7. That is, if the concentration of sulfurous acid is constant (for example, 2 mmol/liter), an experiment provides the characteristics as shown in FIG. 7, which enables the determination of a target initial SV0 value of ORP based on the input of a pH value.

Meanwhile, a detected value of the concentration of sulfurous acid of the absorbent slurry PN provides a variation $\epsilon 2$ (=SN−PN) as a difference between a preset concentration of sulfurous acid SN and the detected concentration of sulfurous acid PN, which is multiplied by a proportional coefficient K1 to provide a corrected target value SV1. From this correction target value SV1 and the aforementioned target initial value SV0, the final target value, SV (=SV1+SV0) is calculated.

In this case, a central value within the aforementioned proper range of the concentration of sulfurous acid (e.g., about 0.5–3 mmol/liter) is preferably adopted as a preset concentration of sulfurous acid SN. The corrected target value SV1 is intended for a direct correction of the target control value SV of ORP based on the detected value of the concentration of sulfurous acid PN in order to avoid the situation where the concentration of sulfurous acid is constantly out of a preferred range, because of an abnormal change or the like of the property of the absorbent slurry causes an actual correlation between ORP and the concentration of sulfurous acid to deviate from the characteristics of the optimum preset ORP against pH found in the STE 21, despite the fact that ORP itself is normally controlled at or in the neighborhood of a target value. In the case where a detected value of the concentration of sulfurous acid PN becomes larger than a preset value of SN to make a variation $\epsilon 2$ (=SN−PN) negative (insufficient oxidation), the value and polarity of the proportional factor k1 are set so that the corrected target value SV1 becomes a positive value proportional to the variation $\epsilon 2$ to such an extent that the target value SV of ORP is incremented to offset the variation $\epsilon 2$.

Figure 2:
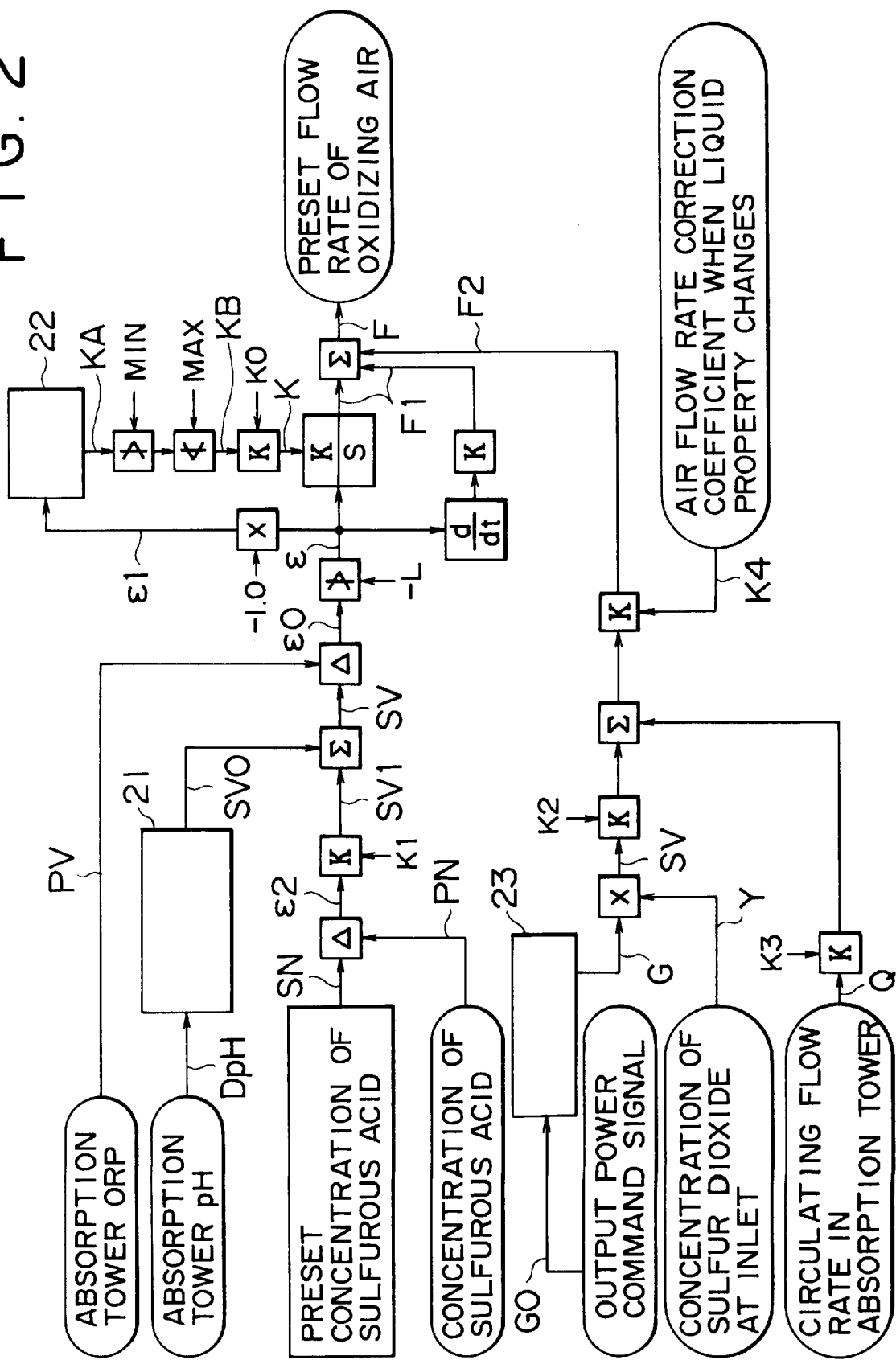
FIG. 2 illustrates an example of the logic sequence of a specific treatment according to the method for controlling oxidation relating to the first embodiment of the present invention.
Figure 6:
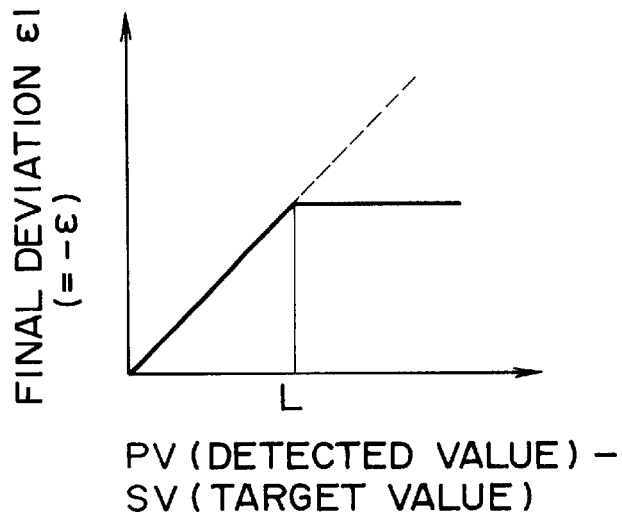
FIG. 6 explains an upper limit of ORP deviation in the above-mentioned logic sequence.

Meanwhile, a detected value of ORP, PV from the electrode 8 is subtracted from the final target value SV of ORP to obtain a base deviation $\epsilon 0$ (SV−PV) for ORP feed back control. Through the lower limit regulating element as shown in FIG. 2, the base deviation $\epsilon 0$ provides a final deviation $\epsilon[\epsilon=\epsilon 0 \ (\epsilon 0 > -L), \ \epsilon=-L \ (\epsilon 0 \leq -L)]$. In the case where the detected value PV of ORP is significantly greater than the target value SV and thus the supply of the oxidizing air is drastically reduced, the lower limit L does not allow the deviation $\epsilon$ to lower further so as to avoid excessive change of the preset flow rate of oxidizing air (i.e., control input), as shown in FIG. 6. It is set to be about −150 mV of ORP as an example.

The control input F1 for the feed back control of the flow rate of oxidizing air is fed from the above-described final deviation $\epsilon$ after so-called PID computation according to the following equation (4) based on the proportional element, integration element and differentiation element shown in FIG. 2.

$$F1 = K \cdot \varepsilon + \frac{1}{TI}\int_0^t K \cdot \varepsilon \, dt + TD \cdot \frac{d(K \cdot \varepsilon)}{dt} \quad (4)$$

In this case, a proportional gain (proportional sensitivity) K of the equation (4) is calculated on a deviation $\epsilon 1$ which is obtained by reversing the polarity of the aforementioned deviation $\epsilon$. That is, firstly, the computation according to the following equation (5) is conducted using a proportional sensitivity optimizing computational element 22 to obtain a computational intermediate sensitivity KA.

$$KA = \frac{\exp\left(\frac{\varepsilon 1 + a}{-m}\right)}{(-m) \cdot (-b)} \quad (5)$$

Next, using a lower limit regulating element and an upper limit regulating element shown in FIG. 2, a computational intermediate sensitivity KB (for example, the one shown in FIG. 5) is formed by restricting the value of KA by a lower limit MIN and an upper limit MAX and then a proportional sensitivity K (=KO·KB) is formed by uniformly multiplying KB by a proportional coefficient KO.

Figure 4:
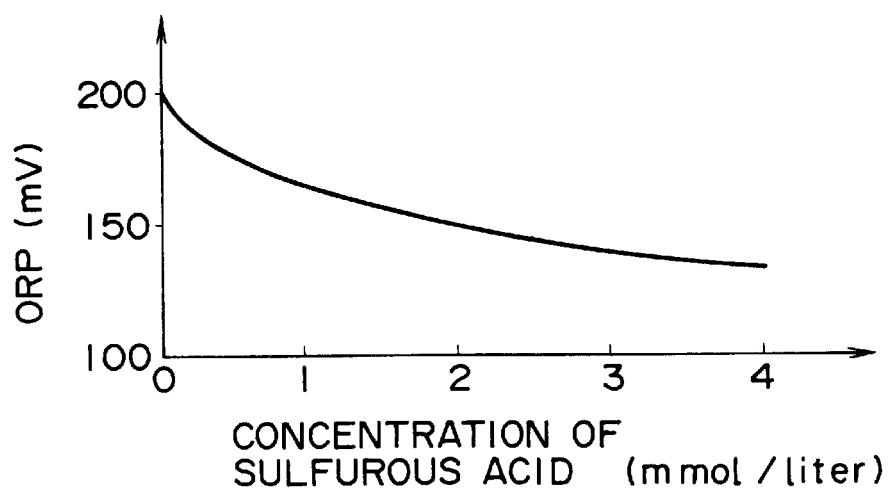
FIG. 4 illustrates an example of the relationship between the concentration of sulfurous acid and oxidation-reduction potential of an absorbent liquid in the above-mentioned desulfurization apparatus.
Figure 5:
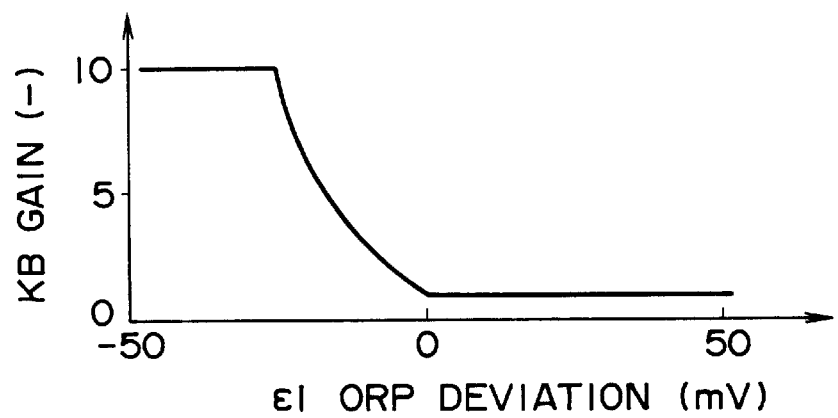
FIG. 5 explains the characteristics of proportional sensitivity in the above-mentioned logic sequence.

In this case, the proportional sensitivity optimizing computational element 22 increases the proportional sensitivity K in the region where a detected value PV of ORP is smaller than a preset value SV, in correspondence, for example, with a characteristics change of ORP against concentration of sulfurous acid shown in FIG. 4. As stated previously, a characteristic curve of ORP against concentration of sulfurous acid is known to exhibit an exponentially attenuated slope on a insufficient oxidizing side (on a side where the concentration of sulfurous acid increases) as shown in FIG. 4. In order to control the concentration of sulfurous acid within a certain range through the regulation of the flow rate of oxidizing air based on a detected ORP value, because the sensitivity of control substantially decreases, the proportional sensitivity is increased to offset the decrement, for example, as shown in FIG. 5.

Constants m, a and b in the equation (5) may be set to an appropriate value, respectively, to match the actual change of ORP in order to achieve the objective. In the case of a flue gas desulfurization apparatus for a power generating plant of 400 MW, for example, the constants may take the following values: m=13.0; a=17; b=0.0205.

Besides, a proportional coefficient KO, integration time TI and differentiation time TD in the equation (4) may be set by a commonly known optimizing coordination or otherwise may be set by experimental or on-site adjustment so that a maximum sensitivity is obtained within a range which allows the stability and the like of the system.

A feed forward control treatment for forming a control input F2 is explained below. After the input of an output power command signal GO, the quantity of gas to be treated G is obtained from a flow rate table of gas to be treated 23. The flow rate table of gas to be treated 23 is intended for providing the quantity of gas to be treated G based on the output power command signal GO (a boiler load), as exemplified by a curve of FIG. 8 for a power generating plant of 400 MW.

The multiplication of the quantity G of gas to be treated, by a detected value Y of the concentration of sulfur dioxide, gives the quantity of sulfur dioxide SV. The quantity of sulfur dioxide SV is multiplied by a proportional coefficient K2 and is further added with a product obtained by multiplying a detected value of circulating flow rate of absorbent slurry Q by a proportional coefficient K3. The obtained result is multiplied by an air quantity correction coefficient for the change in the property of liquid K4 to provide an control input F2. That is, F2=K4(K2·SV+K3·Q).

Here, the proportional coefficient K2 corresponds to the quantity of required air per unit quantity of the sulfur dioxide SV. And, K2·SV is a value corresponding to the quantity of air required for complete oxidation of the sulfur dioxide in the case where the property of the absorbent slurry is in a normal state without taking an auto-oxidation into consideration. The required quantity of air generally needs to be reset by experiment or by test run for each operation of an actual facility, and thus the value of the proportional coefficient K2 is adjusted. For example, generally the required quantity of air is known to be about two times the quantity stoichiometrically obtained for complete oxidation of the sulfur dioxide.

The proportional coefficients K3 and K4 are to correct the above-described air requirement K2·SV obtained from the sulfur dioxide quantity SV in order to better match the final input control for air flow rate F2 to the actually required quantity of air which varies depending on such factors as the amount of auto-oxidation or property of absorbent slurry.

Figure 9:
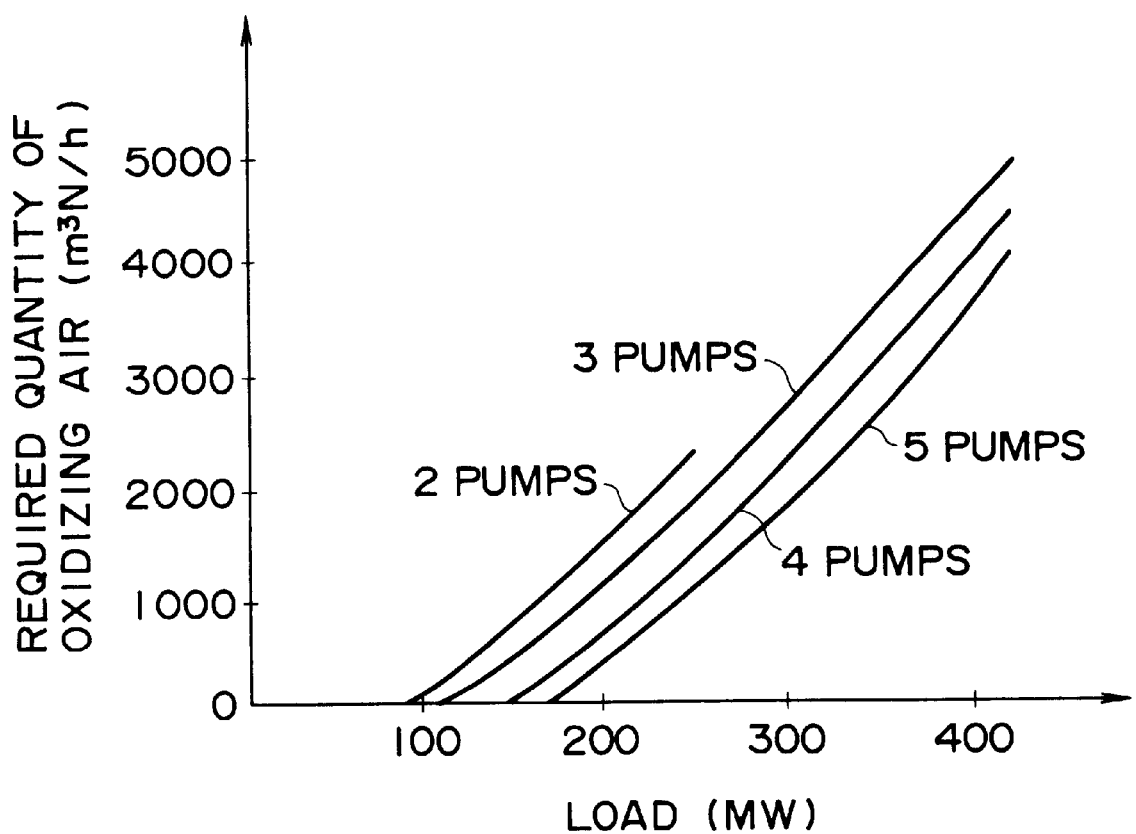
FIG. 9 illustrates an example of the correlation between the number of absorbent liquid circulating pumps (circulating flow rate) and the required quantity of oxidizing air in the above-mentioned desulfurization apparatus.

For example, FIG. 9 illustrates the correlation between boiler load and required quantity of oxidizing air in the case where the number of circulating pumps varies from 2 to 5 in a flue gas desulfurization facility for a power generating plant of 400 MW. As is apparent from FIG. 9, the required quantity of oxidizing air uniformly drops as the circulating flow rate increases by increasing the number of circulation pumps. As the circulating flow rate of the absorbent slurry increases, the amount of auto-oxidation, such as so-called "waterfall basin oxidation" due to the oxygen in the flue gas, will presumably increase. Accordingly, the required quantity of air for the forcible oxidation is reduced. In the method of the present invention, an increment or decrement of the required quantity of oxidizing air depending on the circulating flow rate of the absorbent slurry is in advance obtained from an experiment or the like and a proportional coefficient K3 is set to a value so that the foregoing increment or decrement is reduced from the above-described air requirement K2·SV obtained from the sulfur dioxide quantity SV.

Besides, it is known that an absorbent slurry contains impurities, such as Mg, Cl, F, Al and Mn, derived from a flue gas or water for forming the slurry, which impurities hinder the aforementioned reactions (1)–(3) depending on such factors as concentration and pH (i.e., properties of the liquid) of the slurry to an extent that the actually required quantity of oxidizing air varies. The concentration of such impurities may abnormally increase, for example, by the malfunction of an electric dust collector positioned upstream to a desulfurization facility.

From this viewpoint, in the method of the present invention, the above-mentioned properties of liquid and variation in the required quantity of oxidizing air are in advance obtained from an experiment or the like and the obtained results are saved in a data table. And, the concentration of impurities, such as Cl, is periodically detected by a manual analysis so that the proportional coefficient K4 is reset to a value that is determined from the above-mentioned data table in accordance with the analytically found concentration and detected pH value (i.e., properties of the liquid).

Based on the following functions, the oxidation controlling method according to the present invention explained below enables minimal required quantity of oxidizing air to control the concentration of sulfur dioxide in the absorbent slurry within a proper range effectively and securely, and to avoid in a reliable manner the problems, such as the generation of peroxides and increase in COD, while maintaining a stable desulfurization by a satisfactory follow-up to a sudden change in load.

(1) The value of proportional sensitivity K in PID computation for feed back control based on ORP is exponentially increased depending on the deviation $\epsilon 1$ in the region where a detected value PV of ORP is smaller than a target value SV (the region where $\epsilon 1 < 0$) in correspondence with the characteristic change of ORP against the concentration of sulfurous acid as shown in FIG. 5. Consequently, the disadvantage where a delay in action to increase the flow rate of oxidizing air, at the time when ORP is on the decrease (at the time when the concentration of sulfurous acid is on the increase) due to change in load, may cause the concentration of sulfurous acid to exceed a proper range, is significantly reduced.

(2) As shown in FIG. 6, an upper limit L of deviation is set in the region where the detected value PV of ORP is greater than the target value SV so that the control input of the quantity of the oxidizing air F may not excessively change in the case where the deviation $\epsilon 0$ exceeds the upper limit. Consequently, the disadvantage where a delay in the action to increase the flow rate of oxidizing air, at the time when change in load reverses the condition and ORP abruptly drops, may cause the concentration of sulfurous acid to exceed a proper range, in the case where a detected value PV of the ORP is greater than a target value SV thus indicating an excessive oxidation (in the case where the supply flow rate of the oxygen-containing gas is diminished), is eliminated.

(3) A pH value of the absorbent slurry is continuously detected and the target value SV of ORP in feed back control is adapted to change depending on the detected value DpH in correspondence with the characteristic change of ORP against pH. Consequently, the disadvantage where the concentration of sulfurous acid is out of a proper range despite the fact that ORP itself is normally controlled within a proper range, in the case that pH is changed, is eliminated.

(4) In the method of the present invention, the action to increase or decrease the target value SV of ORP indirectly increases or decreases the deviation $\epsilon 0$ depending on the variation $\epsilon 2$ of the concentration of sulfurous acid to regulate the flow rate of oxidizing air F in a direction which offsets the variation $\epsilon 2$. Consequently, the disadvantage where the concentration of sulfurous acid is constantly out of a proper range even in the case when the predicted correlation between the concentration of sulfurous acid and ORP disagrees with the actual situation, for example, because of an abnormal change of the liquid property of the absorbent slurry, is eliminated.

The operation to detect the concentration of sulfurous acid in the absorbent slurry requires at least 10 to 20 minutes, as described above, and the correction of ORP control by the detection of the concentration of sulfurous acid is not expected to be a highly reliable response. However, this correction is practically sufficient, because such a change including abnormal change of the liquid property of the absorbent does not occur frequently.

(5) The control input for oxidizing air flow rate F2 in the feed forward control is increased or decreased depending on the circulating flow rate of the absorbent slurry Q so that the air flow rate is decreased by a quantity proportional to auto-oxidation and the control input F2 agrees with the actually required quantity of air. Consequently, a smoother feed forward control of the flow rate of oxidizing air can be achieved so as to maintain the concentration of sulfurous acid within a proper range in a more stable manner. In addition, the reduction of unnecessary air supply and power consumption and prevention of the problems due to excessive oxidation can be achieved in a effective and reliable manner.

(6) In the method of the present invention, the control input for oxidizing air flow rate F2 in the feed forward control is increased or decreased depending on the liquid properties of the slurry which are detectable by the concentration of a soluble component (e.g., Cl) or pH of the absorbent slurry so that the supply air flow rate is controlled to a minimal requirement corresponding to the variation in the quantity required for forcible oxidation which depends on the change in liquid property of the absorbent slurry. Consequently, even in the case where the change in liquid property of the absorbent slurry due, for example, to contamination with impurities causes the quantity of oxidizing air basically required for the quantity of the sulfur dioxide in the flue gas to vary, it is possible to follow this variation so that the flow rate of oxidizing air is controlled to the minimal requirement.

Modified Embodiment

The above-described embodiment includes the following examples of a modified embodiment. That is, apart from the construction shown in FIG. 2, a logic construction that realizes the same idea within a conceivable scope may be adopted. Besides, the differentiating or integrating action for the ORP control or a feed forward control, based on the quantity of the sulfur dioxide, may be omitted depending on conditions. And, although the example of constitution in FIG. 2 shows an embodiment having all the features described in the modes, it is possible to form an embodiment that includes one of the features or a combination of some of the features. Further, the correction owing to the change in liquid property of the absorbent slurry may be conducted by increasing or decreasing the deviation ε0 depending on the liquid property of the slurry, for example, by multiplying the target value SV in the ORP feed back control by a proportional coefficient.

Experimental Example

Figure 10:
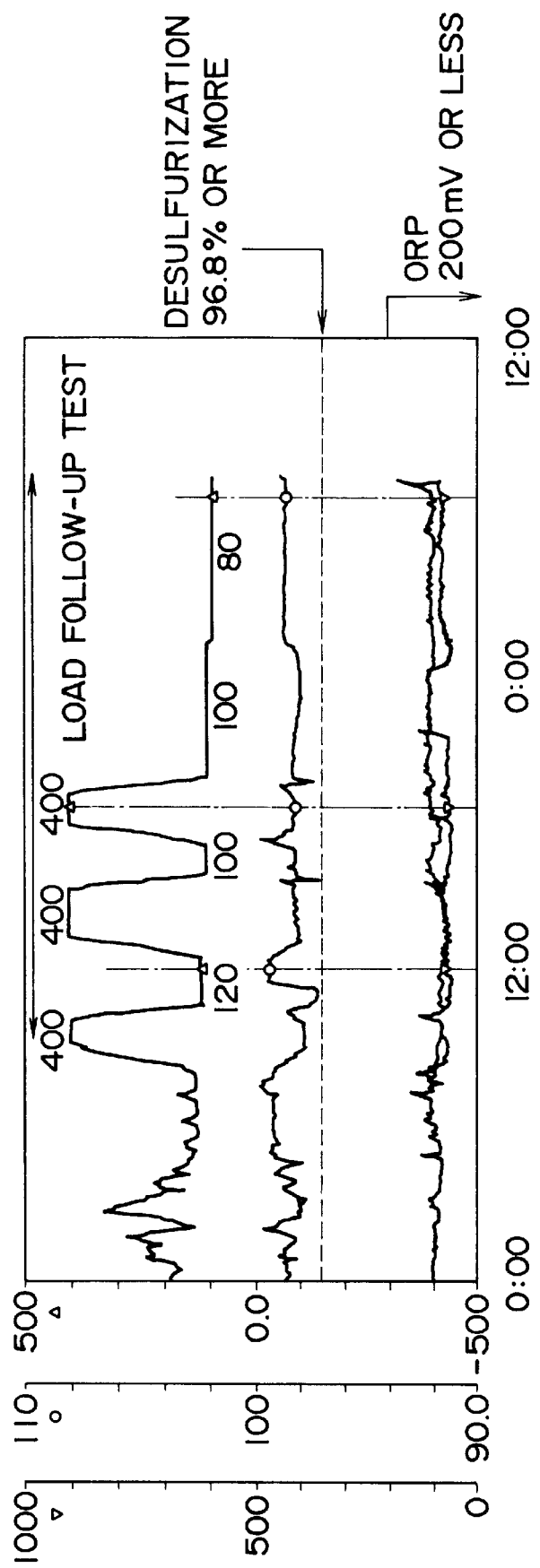
FIG. 10 illustrates the results of a load fluctuation test (Example) to verify the effect of the method for controlling oxidation relating to the first embodiment of the present invention.

FIG. 10 illustrates a desulfurization apparatus for a power generating plant of 400 MW, wherein results of 80 MW–400 MW load change tests by a apparatus having the same construction as in the embodiment shown in FIGS. 1 and 2 or the like (with the proviso that the correction of the target SV of ORP due to the variation ε2 of the concentration of sulfurous acid is not made) are shown.

According to the test results of FIG. 10, the desulfurization is always maintained at a level not less than 96.8% and the concentration of sulfurous acid is evidently maintained within a proper range, irrespectively of an abrupt change in load. In addition, it is clear that ORP is stabilized at about 100 mV indicating the absence of the excessive oxidation even for a short period of time.

Besides, according to the studies of the present inventors, it is understood that, in a normal condition, if a value of ORP is not greater than 300 mV, the formation of peroxides stop, the already formed peroxides decompose, and COD does not increase.

Figure 11:
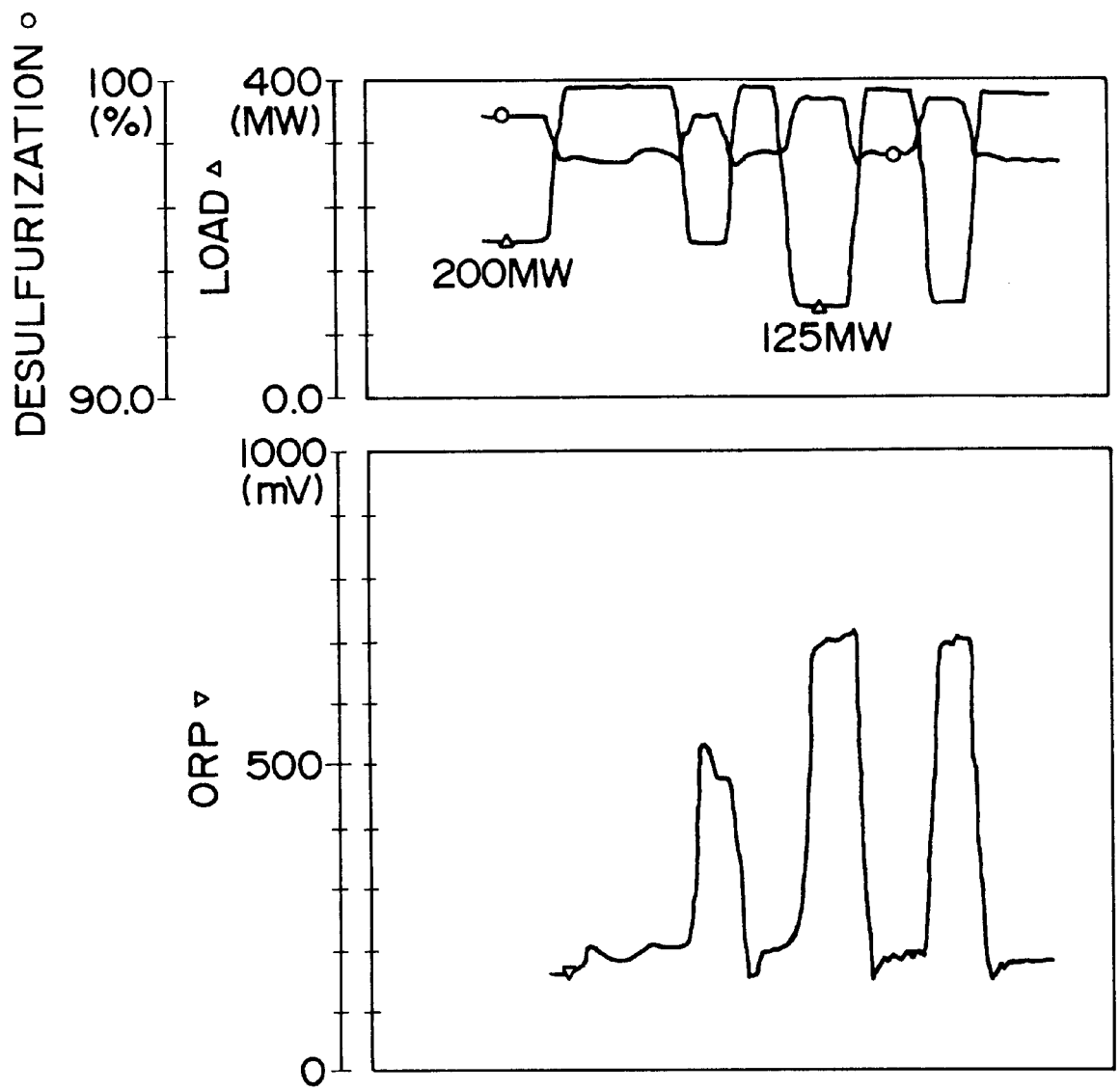
FIG. 11 illustrates the results of a load fluctuation test (Comparative Example) to verify the effect of the method for controlling oxidation relating to the first embodiment of the present invention.

FIG. 11 illustrates, as a comparative example, a desulfurization apparatus for a power generating plant of 400 MW, wherein results of 125 MW–400 MW load change tests by a apparatus in which a mere PID control based on ORP is effected, (with a target value of ORP set to 150–200 mV) are shown.

According to the test results of FIG. 11, although the desulfurization is maintained at a level not less than 96.5%, ORP values significantly exceed 300 mV at every case where a low level of load takes place due to change in load. It is clear that a low load creates the state of excessive oxidation, followed by the increase in COD.

In the method of controlling oxidation by such a mere PID control, an attempt to alleviate the above-mentioned excessive oxidation will necessarily lead to a mere decrease of the target value of ORP, which will apparently make it impossible to maintain a high desulfurization because ORP drops at a high load to an extent that insufficient oxidation (unacceptable concentration of sulfurous acid) will result.

We claim:

1. A method for controlling oxidation in flue gas desulfurization which comprises bringing a flue gas into contact with an absorbent liquid containing a calcium compound for removal of at least sulfur dioxide from the flue gas, while maintaining a concentration of sulfurous acid in the absorbent liquid within a low level range close to zero by a feed back control process, comprising continuously detecting a flow rate of an oxidation-reduction potential of the absorbent liquid and increasing or decreasing a flow rate of an oxygen-containing gas to be blown into the absorbent liquid so that the detected oxidation-reduction potential matches a predetermined target (oxidation reduction potential (ORP)) value, wherein when the flow rate of the oxygen containing gas is to be increased, a proportional sensitivity in the feed back control process, which determines a control input, F1, for regulating the flow rate of the oxygen-containing gas based on a deviation obtained from a difference between the target (ORP) value and a detected (ORP) value, is increased depending on the increase of the deviation in a region where the detected (ORP) value is below the target (the predetermined ORP target value) in correspondence with a characteristic change of the oxidation-reduction potential against the concentration of sulfurous acid, wherein the control input, F1, is given by the equation (4) as follows:

$$F1 = K \cdot \varepsilon + \frac{1}{TI}\int_0^t K \cdot \varepsilon \, dt + TD \cdot \frac{d(K \cdot \varepsilon)}{dt} \quad (4)$$

wherein K is the proportional gain or sensitivity and ε is the final deviation, TI is an integer time and TD is a differentiation time, and wherein K of equation (4) is calculated from a deviation ε1 obtained by reversing the polarity of ε and utilizing equation (5) to obtain a computational intermediate sensitivity KA, to wit;

$$KA = \frac{\exp\left(\frac{\varepsilon1 + a}{-m}\right)}{(-m) \cdot (-b)} \quad (5)$$

wherein a, b and m are constants, wherein the intermediate sensitivity KA is used to form a computational intermediate sensitivity KB and the proportional sensitivity K is obtained by multiplying KB by a proportional coefficient KO.

2. A method for controlling oxidation in flue gas desulfurization which comprises bringing a flue gas into contact with an absorbent liquid containing a calcium compound for removal of at least sulfur dioxide from the flue gas, while maintaining a concentration of sulfurous acid in the absorbent liquid within a low level range close to zero by a feed back control process, comprising continuously detecting an oxidation-reduction potential of the absorbent liquid and increasing or decreasing a flow rate of an oxygen-containing gas to be blown into the absorbent liquid so that the detected oxidation-reduction potential matches a predetermined target (oxidation reduction potential (ORP)) value, wherein when the flow rate of the oxygen containing gas is to be decreased, an upper limit for a deviation obtained from a difference between the target ORP value and a detected ORP value is set up in a region where the detected ORP value is above the target ORP value so that a control input, F1, regulating the flow rate of the oxygen-containing gas does not excessively decrease in the case where the deviation obtained exceeds the upper limit, wherein the control input, F1, is given by the equation (4) as follows:

$$F1 = K \cdot \varepsilon + \frac{1}{TI}\int_0^t K \cdot \varepsilon \, dt + TD \cdot \frac{d(K \cdot \varepsilon)}{dt} \quad (4)$$

wherein K is the proportional gain or sensitivity and ε is the final deviation, TI is an integer time and TD is a differentiation time, and wherein K of equation (4) is calculated from a deviation ε1 obtained by reversing the polarity of ε and utilizing equation (5) to obtain a computational intermediate sensitivity KA, to wit;

$$KA = \frac{\exp\left(\frac{\varepsilon 1 + a}{-m}\right)}{(-m) \cdot (-b)} \quad (5)$$

wherein a, b and m are constants, wherein the intermediate sensitivity KA is used to form a computational intermediate sensitivity KB and the proportional sensitivity K is obtained by multiplying KB by a proportional coefficient KO.

3. A method for controlling oxidation in flue gas desulfurization which comprises bringing a flue gas into contact with an absorbent liquid containing a calcium compound for removal of at least sulfur dioxide from the flue gas, while maintaining a concentration of sulfurous acid in the absorbent liquid within a low level range close to zero by a feed back control process, comprising continuously detecting an oxidation-reduction potential of the absorbent liquid and increasing or decreasing a flow rate of an oxygen-containing gas to be blown into the absorbent liquid so that the detected oxidation-reduction potential matches a predetermined target value, wherein a pH value of the absorbent liquid is continuously detected and a target value of the oxidation reduction potential in the feed back control is adapted to decrease depending on the increase of detected pH value in correspondence to the characteristic change of the oxidation-reduction potential against pH.

4. A method for controlling oxidation in flue gas desulfurization which comprises bringing a flue gas into contact with an absorbent liquid containing a calcium compound for removal of at least sulfur dioxide from the flue gas, while maintaining a concentration of sulfurous acid in the absorbent liquid within a low level range close to zero by a feed back control process comprising continuously detecting an oxidation-reduction potential of the absorbent liquid and increasing or decreasing a flow rate of an oxygen-containing gas to be blown into the absorbent liquid so that the detected oxidation-reduction potential matches a predetermined target value, wherein the target ORP value in the feed back control, depending on the difference between the target concentration of the sulfurous acid and a detected sulfurous acid concentration, is increased or decreased in a direction to offset the difference between the target concentration of sulfurous acid and the detected concentration of sulfurous acid.

5. A method for controlling oxidation in flue gas desulfurization which comprises bringing a flue gas into contact with an absorbent liquid containing a calcium compound for removal of at least sulfur dioxide from the flue gas, while maintaining a concentration of sulfurous acid in the absorbent liquid within a low level range close to zero by a feed back control process, comprising continuously detecting an oxidation-reduction potential of the absorbent liquid and increasing or decreasing a control input, F1, of an oxygen-containing gas to be blown into the absorbent liquid so that the detected oxidation-reduction potential matches a predetermined target (oxidation reduction potential (ORP)) value, and by a feed forward control process comprising continuously detecting a quantity of the sulfur dioxide in the flue gas and increasing or decreasing the flow rate of the oxygen-containing gas depending on the detected quantity of the sulfur dioxide, wherein a control input of the flow rate of the oxygen-containing gas in the feed forward control is decreased depending on the increase of a circulating flow rate of the absorbent liquid so that the flow rate of the oxygen-containing gas is decreased by a quantity equivalent to oxidation replaced by an auto-oxidation, wherein the control input, F1, is given by the equation (4) as follows:

$$F1 = K \cdot \varepsilon + \frac{1}{TI}\int_0^t K \cdot \varepsilon \, dt + TD \cdot \frac{d(K \cdot \varepsilon)}{dt} \quad (4)$$

wherein K is the proportional gain or sensitivity and ε is the final deviation, TI is an integer time and TD is a differentiation time, an wherein K of equation (4) is calculated from a deviation ε1 obtained by reversing the polarity of ε and utilizing equation (5) to obtain a computational intermediate sensitivity KA, to wit;

$$KA = \frac{\exp\left(\frac{\varepsilon 1 + a}{-m}\right)}{(-m) \cdot (-b)} \quad (5)$$

wherein a, b and m are constants, wherein the intermediate sensitivity KA is used to form a computational intermediate sensitivity KB and the proportional sensitivity K is obtained by multiplying KB by a proportional coefficient KO.

6. A method for controlling oxidation in flue gas desulfurization which comprises bringing a flue gas into contact with an absorbent liquid containing a calcium compound for removal of at least sulfur dioxide from the flue gas, while maintaining a concentration of sulfurous acid in the absorbent liquid within a low level range close to zero by a feed back control process, comprising continuously detecting an oxidation-reduction potential of the absorbent liquid and increasing or decreasing the control input, F1, of an oxygen-containing gas to be blown into the absorbent liquid so that the detected oxidation-reduction potential matches a predeteimined target (oxidation reduction potential (ORP)) value, and by a feed forward control process comprising continuously detecting a quantity of the sulfur dioxide in the flue gas and increasing or decreasing the flow rate of the oxygen-containing gas depending on the detected quantity of the sulfur dioxide, wherein a control input of the flow rate of the oxygen-containing gas in the feed forward control is increased depending on an increase of an impurity concentration in the absorbent liquid so that the flow rate of the oxygen-containing gas is controlled depending on the change of the impurity concentration is the absorbent Iiquid, wherein the control input, F1, is given by the equation (4) as follows:

$$F1 = K \cdot \varepsilon + \frac{1}{TI}\int_0^t K \cdot \varepsilon \, dt + TD \cdot \frac{d(K \cdot \varepsilon)}{dt} \quad (4)$$

wherein K is the proportional gain or sensitivity and ε is the final deviation, TI is an integer time and TD is a differentiation time, and wherein K of equation (4) is calculated from a deviation ε1 obtained by reversing the polarity of ε and utilizing equation (5) to obtain a computational intermediate sensitivity KA, to wit;

$$KA = \frac{\exp\left(\frac{\varepsilon 1 + a}{-m}\right)}{(-m) \cdot (-b)} \quad (5)$$

wherein a, b and m are constants, wherein the intermediate sensitivity KA is used to form a computational intermediate sensitivity KB and the proportional sensitivity K is obtained by multiplying KB by a proportional coefficient KO.

* * * * *